June 7, 1960   W. S. EGGERT, JR   2,939,944
METHOD OF FABRICATING HONEYCOMB GRID REINFORCED STRUCTURE
Filed March 18, 1957   2 Sheets-Sheet 1

INVENTOR
Walter S. Eggert, Jr.
BY
Wm. R. Glisson
ATTORNEY

June 7, 1960     W. S. EGGERT, JR     2,939,944
METHOD OF FABRICATING HONEYCOMB GRID REINFORCED STRUCTURE
Filed March 18, 1957     2 Sheets-Sheet 2

INVENTOR
Walter S. Eggert, Jr.
BY Wm. R. Glisson
ATTORNEY

United States Patent Office 2,939,944
Patented June 7, 1960

2,939,944

METHOD OF FABRICATING HONEYCOMB GRID REINFORCED STRUCTURE

Walter S. Eggert, Jr., Philadelphia, Pa., assignor to The Budd Company, Philadelphia, Pa., a corporation of Pennsylvania Filed Mar. 18, 1957, Ser. No. 646,867

5 Claims. (Cl. 219—78)

This invention relates to a method of fabricating a honeycomb grid reinforced structure and has for an object the provision of improvements in this art.

In the manufacture of structures, such as airfoils, having honeycomb grid reinforcement for inner and outer skin sheets much difficulty has been encountered, especially in heat-treating the large assemblies as necessary after the fabricating steps.

Accordingly, it is an object of the present invention to provide a method and construction by which the honeycomb grid is made in small sections which can be easily made and easily brazed and heat-treated in a relatively small oven or furnace, these grid sections then being incorporated in the skin enclosed sandwiches in such a way that a cold rolled skin sheet of maximum strength can be used and a final structure of maximum strength produced.

Another object is to provide honeycomb units which fit along irregular lines so as to avoid straight lines of weakness in the final structure.

The objects and novel features of the invention will be apparent from the following description of an exemplary embodiment thereof, reference being made to the accompanying drawings, wherein.

Figure 3:
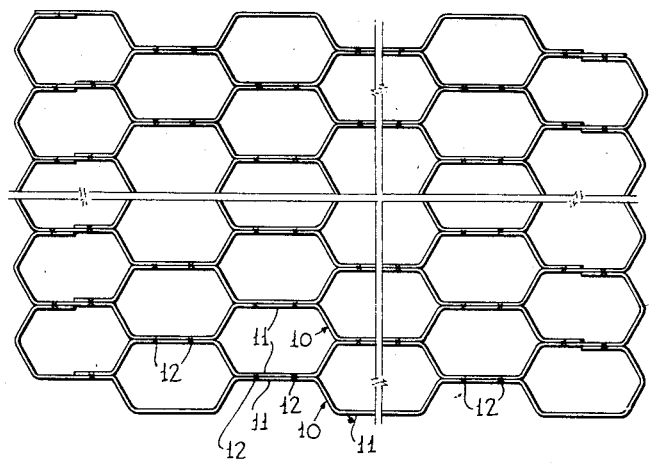
Fig. 3 is a partial plan view of a honeycomb grid.
Figure 4:
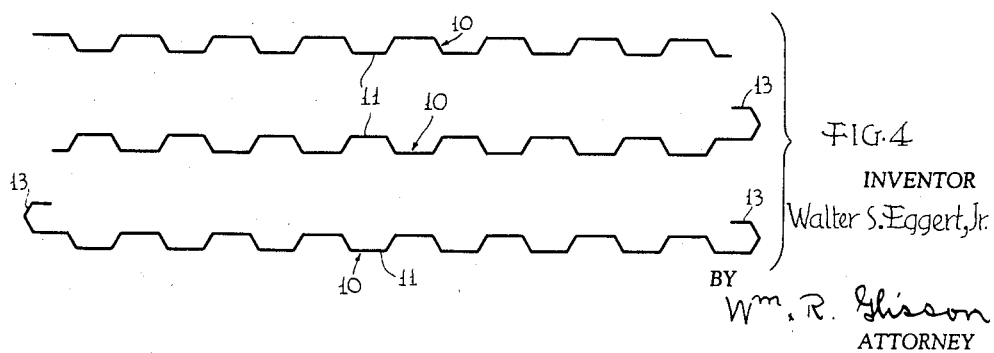
Fig. 4 is a plan view of a plurality of strip elements in process of being assembled.

As shown in Fig. 4 the basic elements of the honeycomb grid are preformed strips 10 having angular corrugations 11 which mate with corrugations of other strip elements for securement together, as by welds 12 shown in Fig. 3. Certain of the strip elements are formed with inturned ends 13 to make a strong structure at the ends for securement to similar ends of other sections or to related parts, as by welding or other means.

When a honeycomb grid unit is thus formed it is ground on its surfaces at the ends of the honeycomb spaces.

On the ground surfaces of the honeycomb unit there are placed thin sheets with brazing material between. This brazing material may be provided by plating the ends of the grid or the surfaces of the sheets, or both. One of these sheets, designated as 15, is provided with apertures 16 matching the honeycomb spaces to receive welding electrodes and the other sheet 17 is provided with apertures 18 at selected locations to vent air when assembled with a skin sheet. There may be side apertures between honeycomb spaces to permit passage of air during subsequent evacuation, if desired.

The sheets 15 and 17 are pressed tightly to the honeycomb grid unit at all points, as by creating a vacuum interiorly, and the unit assembly is placed in a furnace and brazed. It is then heat-treated to increase the physical properties of the structure.

Figure 1:
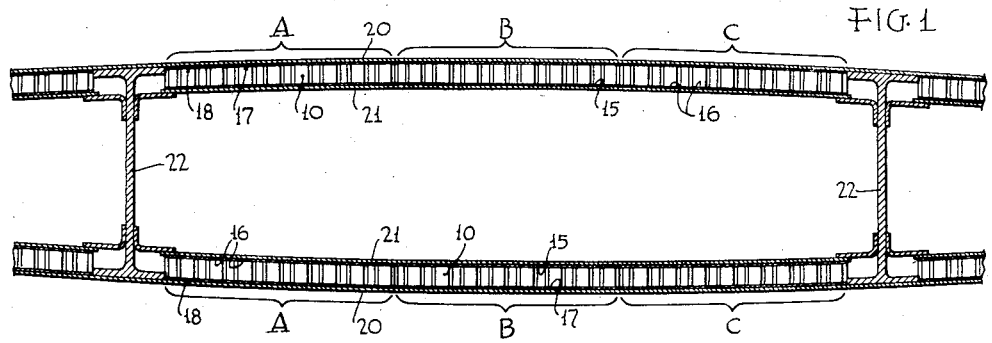
Fig. 1 is a transverse section of an airfoil embodying the invention.
Figure 2:
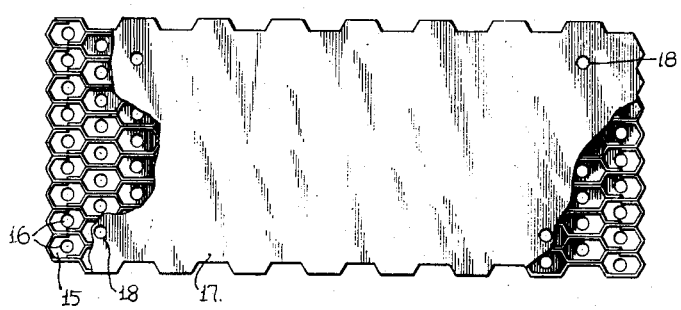
Fig. 2 is a plan view, with parts broken away, showing a sectional honeycomb grid sub-assembly.
Figure 5:
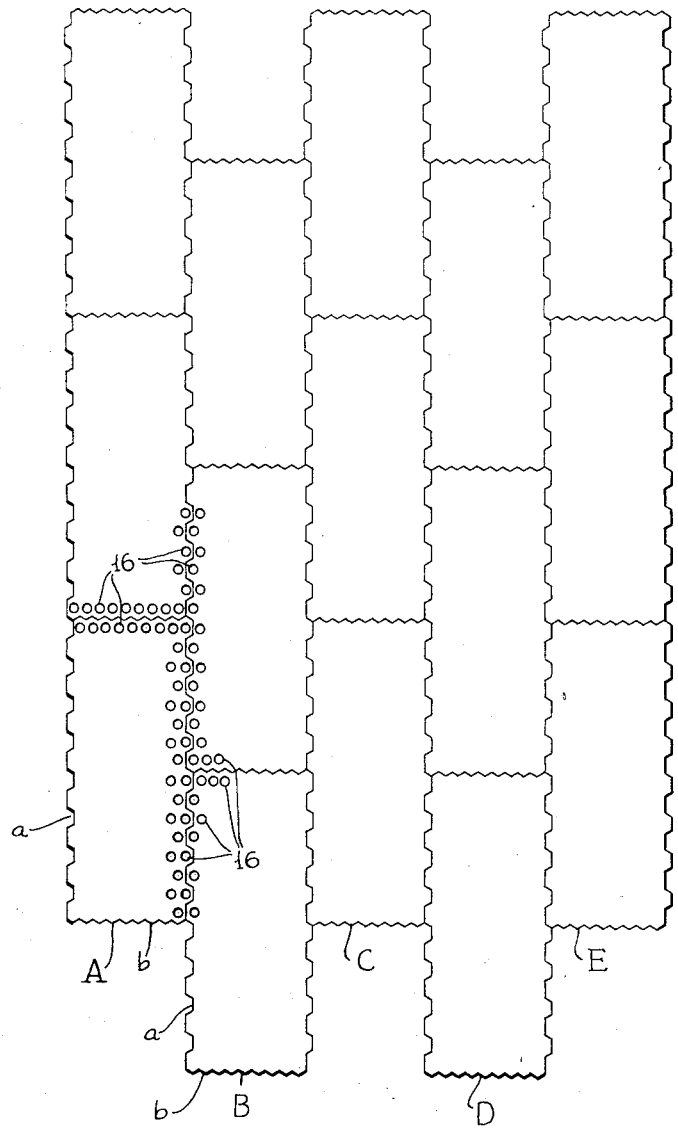
Fig. 5 is a plan view of an assembly comprising a plurality of honeycomb units prior to the attachment of a skin sheet.

As many units as are required and of such shapes as are required are assembled together along longitudinal and transverse lines, as shown in Fig. 5, ready for further assembly procedure. Three units, A, B and C are indicated by brackets in Fig. 1 and longitudinally there may be as many of these A, B, C units as needed. In Fig. 5 a number of such assembled units are shown, as they would appear in an airfoil. No attempt is made to show all of the units which would be used for a complete airfoil but only enough to illustrate how they fit together on irregular lines $a$ and $b$ on the sides and ends respectively. The rows have here been designated as A, B, C, D and E. These units may either be brazed or welded together. If welding is used the holes 16 will provide access for electrodes of suitable shape to make the side welds. Only a few such holes are shown.

The connected honeycomb grid assembly is assembled with an outer airfoil or sandwich skin sheet 20 with the grid sheet 15 disposed away from the airfoil sheet 20 and the grid sheet 17 disposed against the airfoil sheet 20. The sheet 17 is welded to the skin sheet 20 by a welding tool having one electrode passed through the apertures 16 in the sheet 15. The apertures 18 in sheet 17 prevent entrapment of air along the skin sheet 20.

An inner sandwich sheet 21 is placed on the other surface of the assembly and secured to the inner grid sheet 15 by projection welding.

Thus the more dependable spot welds which are made by direct action and localized pressure between electrodes for each weld are formed between the less perforated outer grid sheet 17 and the outer airfoil skin sheet 20 which must take the greater loadings while the less dependable projection welds are formed between the more perforated inner grid sheet 15 and the inner airfoil skin sheet 21 which is not required to take as much loading as the outer airfoil skin sheet.

The airfoil sections thus formed are assembled with spars 22 and other elements to form the completed airfoil.

Thus it will be seen that the invention provides a convenient method of assembly and a structure which avails well of the characteristics inherently provided as well as those which are incidental to the method of assembly. Some of the advantages may well be noted.

The grid cover sheets can be very light to save weight, yet are adequate to obtain good securement by brazing to the ends or edges of the honeycomb grid elements. The flexibility of the grid cover sheets allows them to conform fully to the ground surfaces of the grid units. If the airfoil skin sheets, which are heavier and stiffer, have small irregularities the thin grid sheets can yield slightly to conform during spot welding. Direct welds provide greatest strength at the outer skin sheet where loads are greatest, while the brazed and projection-welded connections are disposed interiorly where the loads are distributed and less severe. The entire structure may be formed of stainless steel or other selected material but the enclosed sandwich core sections are not exposed to weather and may permit some saving, either in the selection of grade of stainless steel or even in the use of some other metal of desired characteristics which can be welded to the airfoil skin sheets used.

While one embodiment of the invention has been disclosed for purposes of illustration, it will be understood that there may be other embodiments and modifications within the general scope of the invention.

What is claimed is:

1. The method of forming a honeycomb grid reinforced sandwich structure, which comprises, securing together bent strips to form a small honeycomb grid unit, brazing thin cover sheets to the end edges of the strips on the opposite sides of the grid unit, one of the sheets having electrode-receiving apertures coinciding with honeycomb spaces and the other sheet being generally imperforate, securing a plurality of small grid units together side-to-side, welding a skin sheet to the said other grid cover sheet using an electrode extending through the perforations of said one grid cover sheet, and welding another skin sheet to the said one perforated grid cover sheet by indirect or projection welding.

2. The method of forming a honeycomb grid reinforced sandwich structure, which comprises, welding together bent strips to form a small honeycomb grid unit, brazing a thin perforated sheet and a generally non-perforated sheet to the end edges of the strips on the opposite sides of the grid unit with the perforations coinciding with honeycomb spaces, heat treating the honeycomb grid unit, securing a number of small grid units together side-to-side, spot welding an outer cold-rolled airfoil skin sheet to the generally non-perforated grid cover sheet, working with a welding electrode through the perforations of the perforated grid cover sheet and the honeycomb spaces, and welding an inner sandwich skin sheet to the perforated inner grid cover sheet by indirect or projection welding.

3. The method of forming a reinforced sandwich panel structure, which comprises, forming a honeycomb grid structure with transverse openings and with perforated and generally imperforate sheets secured to the end edges of the grid by brazing on the opposite sides of the grid, assembling a first cover sheet on the grid structure over the generally imperforate sheet and securing it thereto by working with a tool through the openings of the grid and the perforated sheet, then securing a cover sheet to the side of the assembly opposite the first cover sheet.

4. The method as set forth in claim 3, further characterized by the fact that said panel is secured in an airfoil assembly with the first said cover sheet disposed outwardly on the exposed side.

5. The method as set forth in claim 3, further characterized by the fact that said first cover sheet is secured to the generally imperforate sheet of the assembly structure by resistance welding with one electrode disposed in a transverse opening and that the second cover sheet is secured by projection welding to the assembly structure.

References Cited in the file of this patent

UNITED STATES PATENTS

| | | |
|---|---|---|
| 1,042,885 | Budd et al. | Oct. 29, 1912 |
| 1,156,898 | Gravell | Oct. 29, 1915 |
| 2,007,892 | Farr | July 9, 1935 |
| 2,299,776 | Weightman | Oct. 27, 1942 |
| 2,319,455 | Hardman et al. | May 18, 1943 |
| 2,327,265 | Herr | Aug. 17, 1943 |
| 2,481,046 | Scurlock | Sept. 6, 1949 |
| 2,778,458 | Briggs | Jan. 22, 1957 |
| 2,814,717 | Hardesty | Nov. 26, 1957 |